Aug. 22, 1967  J. G. FONTAINE  3,336,841
AIR MOTOR
Filed July 12, 1966
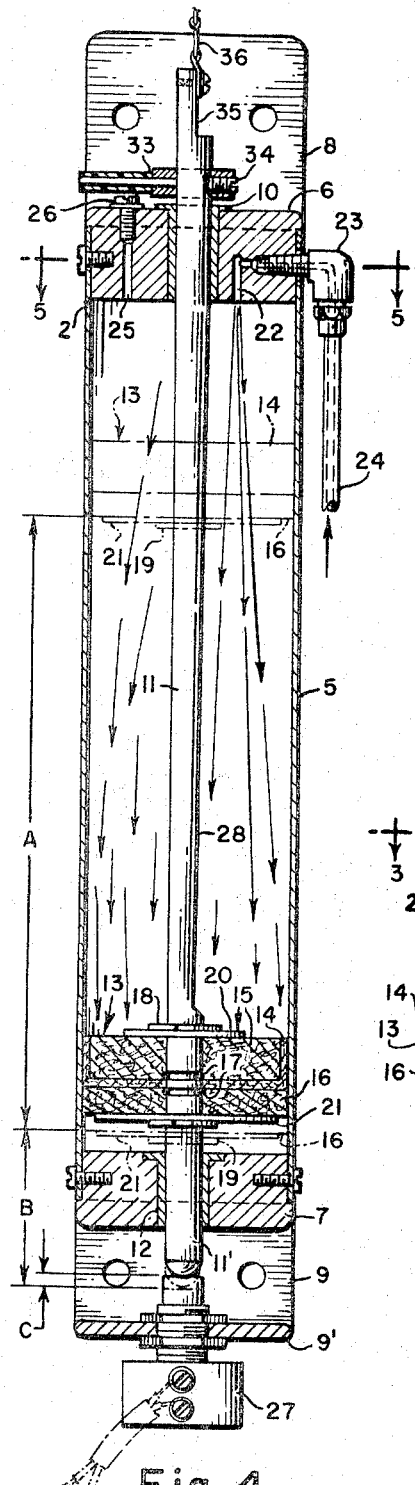
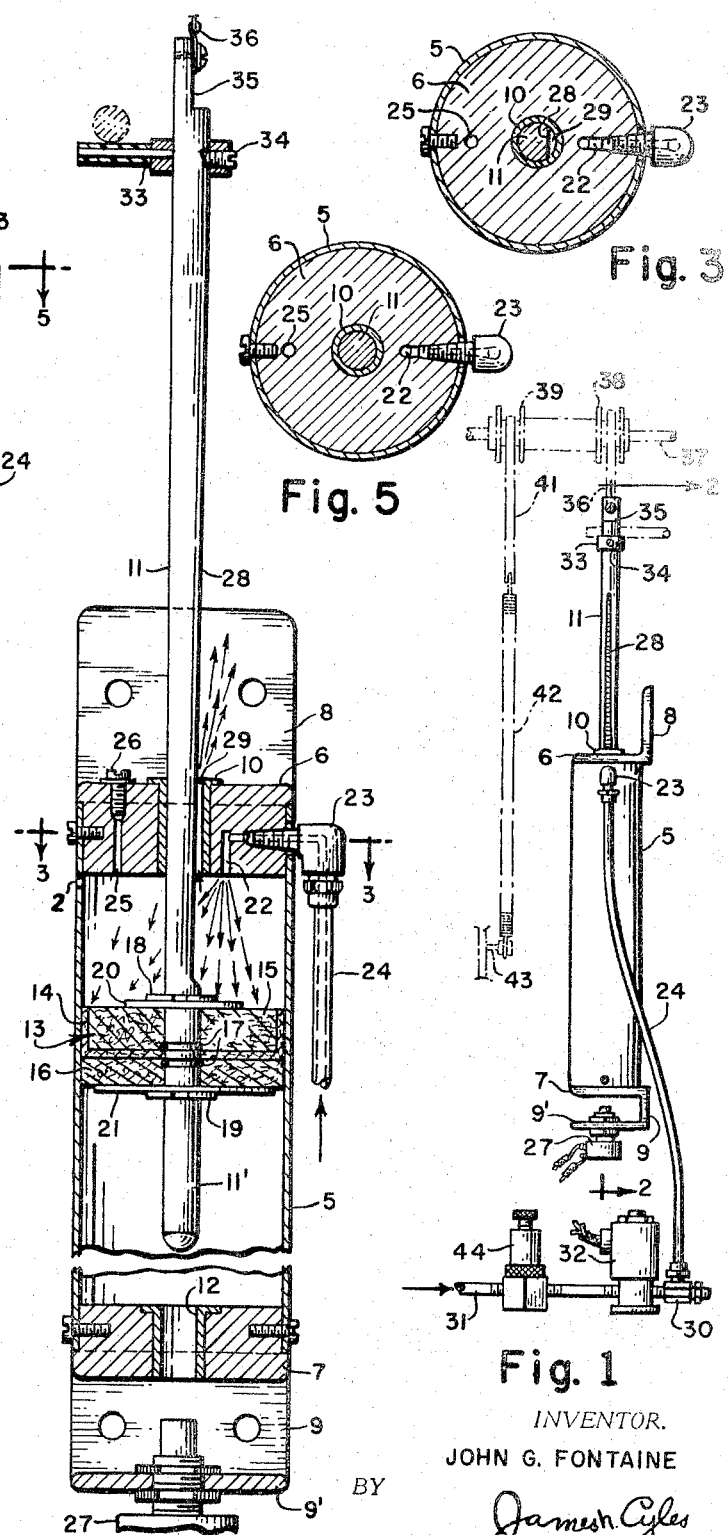
INVENTOR.
JOHN G. FONTAINE
BY James H. Cyles
ATTORNEY United States Patent Office 3,336,841
Patented Aug. 22, 1967

3,336,841
AIR MOTOR
John G. Fontaine, 500 NE. 35th St.,
Fort Lauderdale, Fla. 33308
Filed July 12, 1966, Ser. No. 569,002
2 Claims. (Cl. 91—396)

ABSTRACT OF THE DISCLOSURE

This invention relates to an air motor for imparting a driving action to various apparatus, such for instance as a changeable exhibitor and wherein the exhibitor embodies a plurality of translucent panels that are movable in a step by step relation by the air motor. The air motor comprising a cylinder that is provided with a slidable piston, having a piston rod that extends a substantial distance above the cylinder for connection to an element to be driven and with a compressed air supply entering the cylinder at the upper end for driving the piston downwardly and with the piston rod upon one side having a tapered flat side whereby to permit a leakage of air between the rod and a bearing for supporting the rod and whereby the initial injection of air to the piston head permits the piston to travel downwardly in a smooth stroke for its full travel and forming a variable port with the upper bushing to regulate flow of compressed air gradually as the piston is driven downwardly and with the cylinder adjacent its top being provided with an escape port and for air that is trapped above the piston as it moves to an upper position, the piston and piston rod actuating a pulley to move the translucent panels, one panel at a time before a luminous means and the movement of the panel is determined by the stroke of the piston so that one panel at a time is moved to a display position before a sight opening and with the full movement of the panel being determined by a full downward stroke of the piston and the piston rod.

---

This invention relates to an air motor for imparting a driving action to various apparatus, such for instance as a changeable exhibitor, having upper and lower drive shafts, although not restricted to any particular apparatus other than to limit the stroke or degree of movement, dependent upon a normal stroke of the motor.

The invention contemplates a cylinder that is fixed within the apparatus to be driven and with the cylinder being provided with a movable piston, having a piston rod that is coupled to the piston and that projects a substantial distance above the cylinder, for connection to a flexible drive element and with a compressed air supply having a regulator and a solenoid valve for controlling the flow of compressed air to the upper end of the cylinder.

A further object of the present invention resides in a cylinder that is provided with a slidable piston having a piston rod that extends a substantial distance above the cylinder for connection to an element to be driven and with a compressed air supply entering the cylinder at the upper end for driving the piston downwardly and with the piston rod upon one side having a tapered flat side whereby to permit a leakage of air between the rod and a bearing for supporting the rod and whereby the initial injection of air to the piston head permits the piston to travel downwardly in a smooth stroke for its full travel and with the tapered flat side terminating at the lowermost position of the piston permitting the piston to travel downwardly with an even stroke and with the tapered piston rod forming a variable port with the upper bushing 10 to regulate the flow of compressed air gradually, as the piston is driven downwardly and with the cylinder adjacent its top being provided with an escape port for air that is trapped above the piston as it moves to an upper position. With the piston rod in the uppermost position, the orifice would be at its maximum opening and at that position, the tapered rod permits the exhausting of the most air and, as the piston rod moves downwardly, the tapered shaft would begin to close, exhausting less and less air as it travels downwardly and at the same time permitting more and more air to press against the piston, offsetting the increased displacement of the cylinder and, with the piston reached say ¾ or ⅞ of a stroke downwardly, the variable orifice would be entirely closed, resulting in a very smooth and even stroke from beginning to end of the travel.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a side elevational view of an air motor, that is energized by an air line from a source of air supply, FIGURE 2 is a section taken substantially on line 2—2 of FIGURE 1, FIGURE 3 is a horizontal section taken substantially on line 3—3 of FIGURE 2, FIGURE 4 is a view similar to FIGURE 2, and FIGURE 5 is a horizontal section taken on line 5—5 of FIGURE 4.

Referring specifically to the drawings, there has been provided a cylinder 5, closed at its upper end by a plug 6 and at its lower end by a plug 7. The plug 6 carries a mounting bracket 8, through the medium of which the motor may be mounted in a fixed position adjacent the apparatus to be controlled. The plug 7 carries a U-shaped bracket 9 and with the brackets 8 and 9 being apertured to receive fastening screws for the mounting of the device. The plug 6 axially thereof is provided with a tubular bushing 10 for the slidable reception of a piston rod 11. The plug 7 is also provided with an axially arranged bushing 12 for the passage of the lower end of the rod 11.

Connected to the lower portion of the rod 11, within the cylinder 5 is a piston 13, including a cup washer 14 having an absorbent pad 15 therein and below the washer 14, there is provided an absorbent disc 16. The discs 15 and 16 are fixed with respect to the rod 11 by a pair of O-rings 17. The discs 15 and 16 are further held with respect to the rod 11 by upper and lower split washers 18 and 19 that are forced into engagement with metallic discs 20 and 21 whereby to fix the piston 13 upon the rod, to travel therewith.

The plug 6 is provided with a port 22, that is connected to a coupling 23, that carries the air tube 24 and whereby the compressed air is forced through the port 22 to bear upon the top of the piston 13. The plug 6 is further provided with a port 25, closed by a screw 26, to constitute a filler for oil that is injected into the cylinder 5 above the piston 13. The lower wall 9' of the bracket 9 is provided with a switch device 27, that is axial with respect to the bushing 12 and the rod 11.

The rod 11 for its major length is provided with a flattened area 28, and with respect to the bushing 10, forms an air escape orifice 29, see particularly FIGURE 3. The air tube 24 at its lower end is coupled to a needle valve 30 that is fixed upon an air supply tube 31, leading from the source of compressed air and also fixed upon the air tube 31 is a solenoid valve 32, that is connected to a source of electrical energy and also to the switch 27.

Adjustably disposed upon the rod 11 is a stop device 33, held to the rod by a set screw 34 and adjustable upon the fully cylindrical part of the rod 11 to regulate the travel of the piston 13. The rod 11 at its upper end is notched at 35 and coupled to a flexible element 36, such as a chain and with the chain in the apparatus illustrated in dotted lines in FIGURE 1 comprises a rotatable shaft 37, having a pulley 38 thereon and the chain is engaged about the pulley 38 so that, when the air is admitted to the cylinder 5, forcing the piston 13 downwardly, to pull upon the chain 36, to rotate the shaft in one direction. A second pulley 39, connected to the pulley 38 and wrapped about the pulley 39 is a flexible element, such as a chain or belt 41 and connected to the free end of the chain 41, is a retractile spring 42, connected at its free end to a suitable bracket 43 and the spring 42 with the chain or belt 41 functions to move the rod 11 and the piston 13 upwardly or, to reverse the rotation of the shaft 37.

In the use of the device, a predetermined amount of oil is injected into the cylinder 5 through the port 25 and above the piston 13. The oil will saturate the disc 15 and the disc 16 will also be saturated and also constitutes a wiper for the inner walls of the cylinder and the piston being lubricated by the oil so that the piston is relatively free to rise and fall in the cylinder 5. With the piston 13 in the position shown in FIGURE 2, pressure upon the switch 27, de-energizes the solenoid valve 32, interrupting the escape of compressed air to the tube 24 and to the interior of the cylinder above the piston, forcing the piston downwardly until the lower part of the rod 11, indicated at 11' enters the bushing 12, when air beneath the piston 13 will be compressed and as the piston 13 continues its downward movement, the rod 11' enters the bushing 12 and the position of the piston in FIGURE 4 indicates its maximum downward movement, the rod 11' enters the bushing 12 and the position of the piston in FIGURE 4 indicates its maximum downward movement but, the air beneath the piston 13 functions to cushion the movement of the piston so that it partakes of an override movement, permitting the rod portion 11' to engage the switch 27, de-energizing the solenoid 32 and to interrupt the flow of compressed air through the tube 24. The pipe 31 is also provided with a regulator 44. The flat side 28 of the rod 11, as the piston is forced downwardly forms a variable port 29 that progressively is reduced in size, until the upper end of the rod 11, as shown in FIGURE 5 completely fills the opening of the bushing end, to prevent the escape of air therefrom. With the piston 13 in its downward position, of FIGURE 4 has fully driven the particular apparatus for the predetermined movement and upon the interruption of the compressed air from the port 22, the spring 42 causes the piston to be retracted to the position illustrated in FIGURE 2. With the compressed air entering the cylinder, from the port 22, a certain amount of the air will escape through the port 29, formed by the flat side of the rod 11 and the bushing 10, a certain amount of the air will escape upwardly and prevent a sudden movement of the piston downwardly until the part 11' of the piston rod 11 enters the opening in the bushing 12, when the air below the piston 13, will be compressed, cushioning the piston to its lowermost position and the override of the piston is sufficient to actuate the switch 27, to close the solenoid valve 32 and to interrupt the flow of air to the top of the piston.

To relieve any trapped compressed air above the piston in its uppermost position, the cylinder is provided with a relatively small bleed port 2.

It will be apparent from the foregoing that a very novel type of air motor has been provided. The air motor is capable of actuating various types of mechanical devices, such as a changeable exhibitor or numerous other mechanical devices requiring a limited movement of its parts and the compressed air flow through the cylinder, shifts the piston 13 downwardly for an even stroke of the piston rod and to be cushioned in the lowermost position and then before total stopping has an override movement in the area "B" so that the rod end 11' is capable of engaging the switch button or the switch 27 and the override of the piston downwardly is sufficient to actuate the switch 27 and to control the solenoid valve 32 to interrupt the flow of compressed air. The parts are simple, are strong, durable and most effective as a means for actuating devices requiring a limited movement. The switch 27 functions to de-energize the solenoid valve 32 and suitable mechanism, not shown, is employed to energize the valve 32 as will be apparent. While the pump has been illustrated as being actuated by compressed air, it will be apparent that the movement of the piston may either be controlled by a vacuum or hydraulic pressure.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. An air motor of the character described that comprises a cylinder, closed at its upper and lower ends, a piston slidable in the cylinder, a solenoid valve that is connected to a compressed air reservoir and with the solenoid valve being connected to an upper closed end of the cylinder for directing compressed air into the cylinder and to force the piston downwardly, a control switch carried by a lower end of the cylinder and with the switch being electrically connected to the solenoid valve, a piston rod fixed to the piston and extending upwardly through a bushing and with a lower end of the piston rod projecting downwardly below the piston and slidable through a lower closure of the cylinder when the piston has been forced downwardly and to cause the lower end of the piston rod to engage the switch for the solenoid valve, the upper end of the piston rod being connected to a pulley that is connected to a shaft that is adapted to be rotated when the piston moves downwardly and a second pulley carries upon the shaft and that is provided with a belt that is connected to a retractile spring for returning the piston to an upper position after the switch has been engaged by the piston rod, the cylinder is closed at its opposite ends by heads, a bushing in the upper head and a bushing in the lower head, the piston rod being axial with respect to the cylinder and slidable through the bushings, the upper portion of the piston rod conforming to the diameter of the bushing in the upper head when the piston is in a lowermost position and with the piston rod being flattened on a taper upon one side so as to form a variable air escape opening with the upper bushing when the piston is in the uppermost position and to permit of an escape of air from the air supply to gradually force the piston downwardly to the point where the piston rod at its lower end passes through the lower bushing and to actuate the switch for closing the solenoid valve and to interrupt the flow of air to the cylinder and to permit the spring to shift the piston upwardly.

2. An air motor of the character described for rotating a shaft, the motor embodying a cylinder and a piston slidable therein, the cylinder having upper and lower cylinder heads that are provided with axially arranged bushings, a source of compressed air leading to an upper head of the cylinder whereby to discharge compressed air into the cylinder for driving the piston downwardly, the piston rod being connected at its upper end to a pulley for rotating a shaft in one direction, a second pulley rotatable with the first-named pulley, a flexible strap wound upon the second-named pulley and biased downwardly by a coil spring, the piston and piston rod when forced downwardly by the compressed air, causing the shaft to rotate in one direction and upon an interruption of a flow of compressed air, permits the spring to rotate the shaft in an opposite direction to move the piston and piston rod upwardly, the piston rod having a lower extension that engages the bushing in the lower head of the cylinder and, when the lower extension enters the bushing of the lower head, to cushion the movement of the piston downwardly, to a point where the piston has a slight override movement that is sufficient to trip a switch carried by a bracket upon the lower head of the cylinder and to deenergize a solenoid valve that controls the flow of compressed air through the cylinder, the shaft being rotated in one direction when the piston is forced downwardly and with the piston being shiftable upwardly by the spring when the compressed air has been interrupted.

References Cited

UNITED STATES PATENTS

| | | | |
|---|---|---|---|
| 462,272 | 11/1891 | McGagan | 92—137 |
| 2,973,744 | 3/1961 | Hennells | 91—394 |
| 3,014,493 | 12/1961 | Segar | 91—396 |
| 3,043,093 | 7/1962 | Stott | 92—137 |
| 3,053,187 | 9/1962 | Mashinter | 92—137 |
| 3,111,778 | 11/1963 | Funnesbeck | 92—13 |
| 3,232,182 | 2/1966 | Gilbert | 92—13 |

FOREIGN PATENTS 824,734  12/1959  Great Britain.

MARTIN P. SCHWADRON, *Primary Examiner.*

PAUL E. MASLOUSKY, *Examiner.*